United States Patent
Frantz

[11] 3,890,122
[45] June 17, 1975

[54] PLURAL-STAGE AIR FILTER ASSEMBLY

[75] Inventor: Virgil L. Frantz, Salem, Va.

[73] Assignee: Graham-White Sales Corp., Salem, Va.

[22] Filed: Nov. 1, 1973

[21] Appl. No.: 412,014

[52] U.S. Cl. ............ 55/212; 55/218; 55/267; 55/313; 55/314; 55/337; 55/416; 55/420; 55/432; 55/444; 55/457; 137/204; 137/544
[51] Int. Cl. ............................................ B01d 45/16
[58] Field of Search ............ 55/212, 213, 218, 267, 55/269, 312-314, 319, 320, 337, 392, 394, 395, 397, 399, 420, 423, 424, 426, 432, 456, 457, 191, 204, 416, 444; 137/204, 544, 545

[56] References Cited
UNITED STATES PATENTS

| | | | |
|---|---|---|---|
| 1,774,295 | 8/1930 | Smallhouse | 55/267 |
| 1,824,485 | 9/1931 | Jourdain | 55/267 |
| 1,867,988 | 7/1932 | Safford et al. | 55/420 X |
| 2,106,589 | 1/1938 | Bigger et al. | 55/399 X |
| 2,507,125 | 5/1950 | Townsend | 55/313 UX |
| 2,514,894 | 7/1950 | Naab | 55/269 X |
| 2,669,321 | 2/1954 | Schmidlin | 55/267 X |
| 3,093,467 | 6/1963 | McLaughlin | 55/269 X |
| 3,246,455 | 4/1966 | Boddy | 55/319 |
| 3,402,529 | 9/1968 | Frantz | 55/267 |
| 3,426,508 | 2/1969 | McGrath | 55/267 X |
| 3,516,231 | 6/1970 | George | 55/267 |
| 3,721,069 | 3/1973 | Walker | 55/319 |

FOREIGN PATENTS OR APPLICATIONS 297,510 9/1928 United Kingdom ............ 55/267

OTHER PUBLICATIONS
"The King Compressed Air Filters and Dryers," King Eng. Corp., Ann Arbor, Mich., 10-5-62, pp. 2, 3.

*Primary Examiner*—Frank W. Lutter
*Assistant Examiner*—Kathleen J. Prunner
*Attorney, Agent, or Firm*—Wilmer Mechlin

[57] ABSTRACT

A plural-stage assembly for filtering contaminants from compressed air by sequentially subjecting the air to centrifugal separation, condensation by cooling with arrest of cyclonic flow and, after direction reversal, filtering through a filter medium. This sequential filtering is performed in a housing of detachably connected upper and lower parts with periodic draining of collected contaminants from a sump in the lower part through a drain valve suspended therefrom. Receiving air directly from a compressor, the assembly has check valves at air inlet and outlet ports, the former for preventing damage to the compressor and the latter for maintaining reservoir pressure, when the draining is not limited in duration.

11 Claims, 7 Drawing Figures

PLURAL-STAGE AIR FILTER ASSEMBLY

BACKGROUND OF THE INVENTION

As in the embodiment of FIG. 2 of Frantz U.S. Pat. No. 3,402,529, air filter assemblies connectable to the outlet side of a compressor for filtering air received directly therefrom, have heretofore been devised in which the compressed air is subjected for filtering to centrifugal separation. The present invention is particularly directed to an improvement on the assembly of that embodiment of the Frantz patent.

SUMMARY OF THE INVENTION

The primary object of the present invention is to provide an improved plural stage assembly for filtering compressed air, wherein by sequential centrifugal separation, condensation by cooling with arrest of cyclonic flow and filtering through a filter medium, the air passed through the assembly is substantially free of contaminants.

Another object of the invention is to provide an improved plural-stage air filter assembly receiving air directly from a compressor and draining contaminants collected from the air through a drain valve responsive in opening to idling cycles of the compressor, whereby by having a check valve at its inlet port openable under a predetermined low pressure, the assembly is able to maintain the idling compressor under sufficient pressure to prevent damage.

Another object of the invention is to provide a plural-stage assembly for filtering compressed air, wherein the air is normally filtered in three stages of different types, the filtering is conducted in a housing having detachably connected upper and lower parts with a sump in the lower part from which collected contaminants are bottom-drained periodically through an automatically operated drain valve, the last stage is performed by either of a plurality of interchangeable fine and coarse filters, and the selected filter medium is by-passable in case of plugging for enabling the assembly to continue to operate.

Other objects and advantages of the invention will appear hereinafter in the detailed description, be particularly pointed out in the appended claims and be illustrated in the accompanying drawings, in which:

FIGURE DESCRIPTION

DETAILED DESCRIPTION

Figure 1:
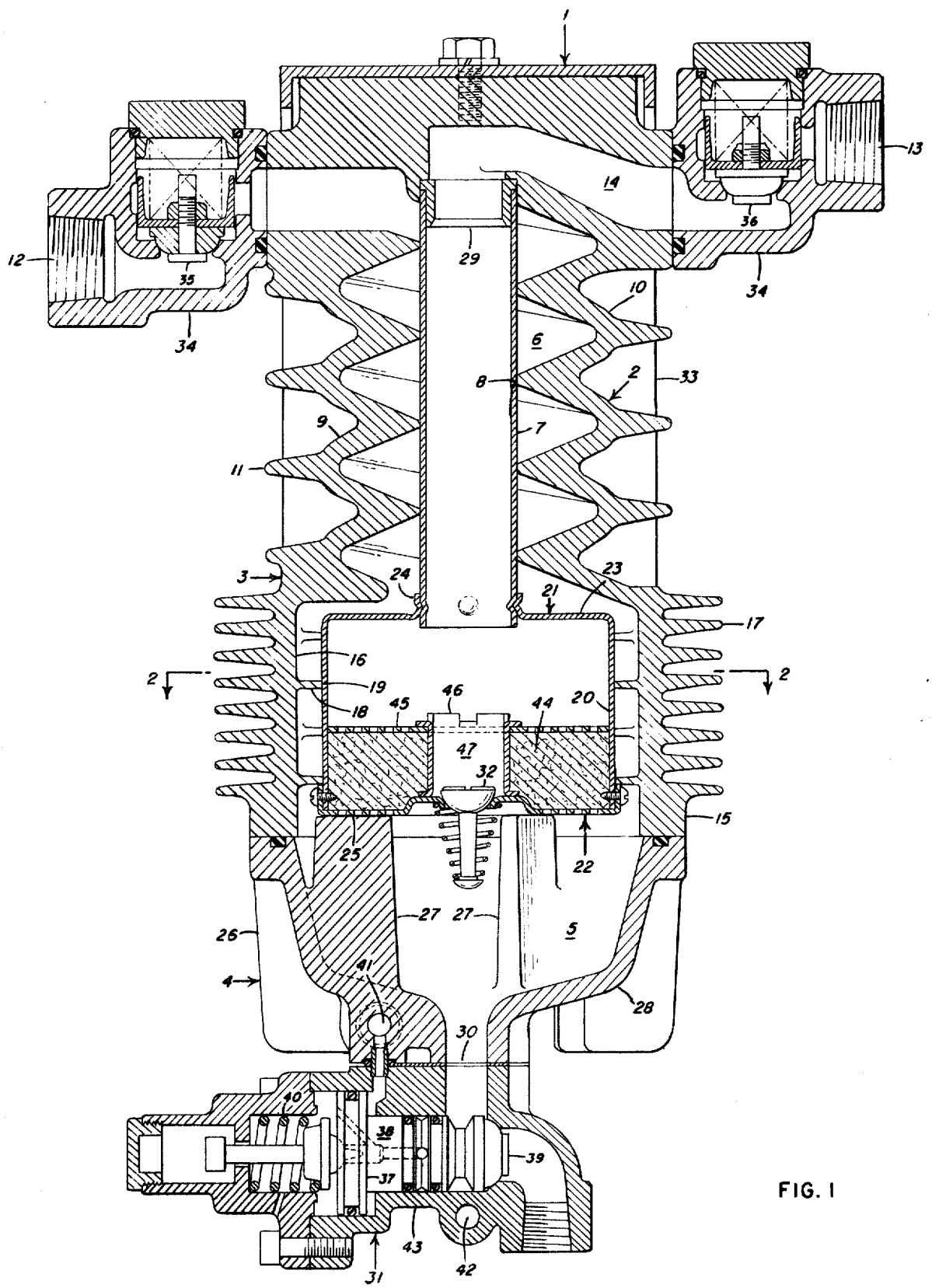
FIG. 1 is a central vertical sectional view of one embodiment of the improved assembly of the present invention.
Figure 6:
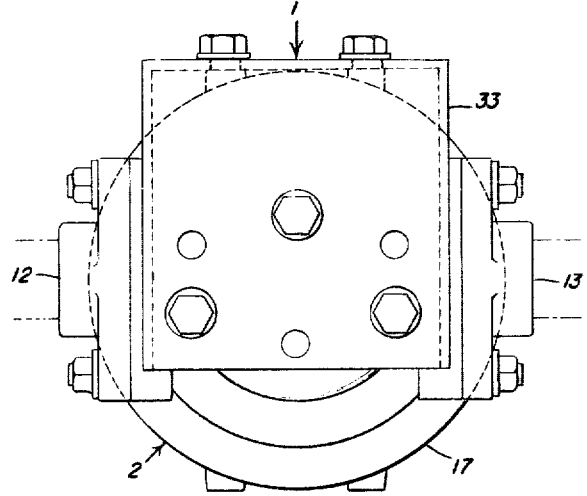
FIG. 6 is a plan view of the embodiment of FIG. 4.

Referring now in detail to the drawings in which like reference characters designate like parts, the improved air filter assembly of the present invention is adapted for use in compressed air systems of vehicles, such as trucks, buses and rapid transit railway cars in which the space available for installation is so limited as to require at least lateral compactness.

Figure 2:
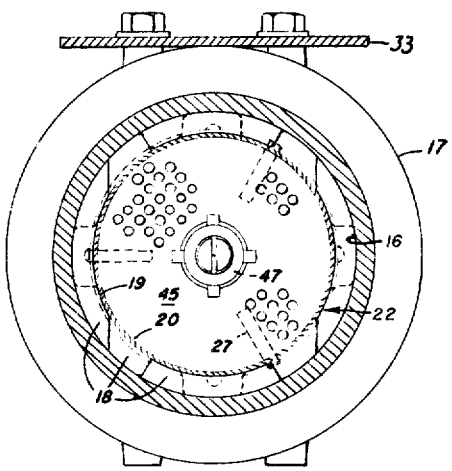
FIG. 2 is a horizontal sectional view on a smaller scale taken along lines 2—2 of FIG. 1.
Figure 4:
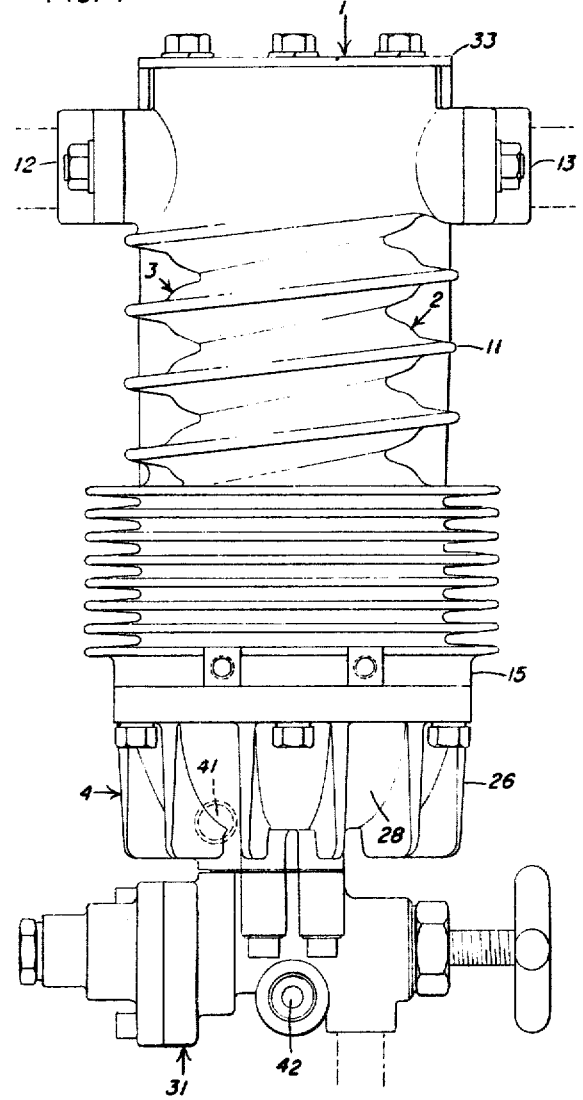
FIG. 4 is a front elevational view on the scale of FIG. 2 of the embodiment of FIG. 3.
Figures 5, 7:
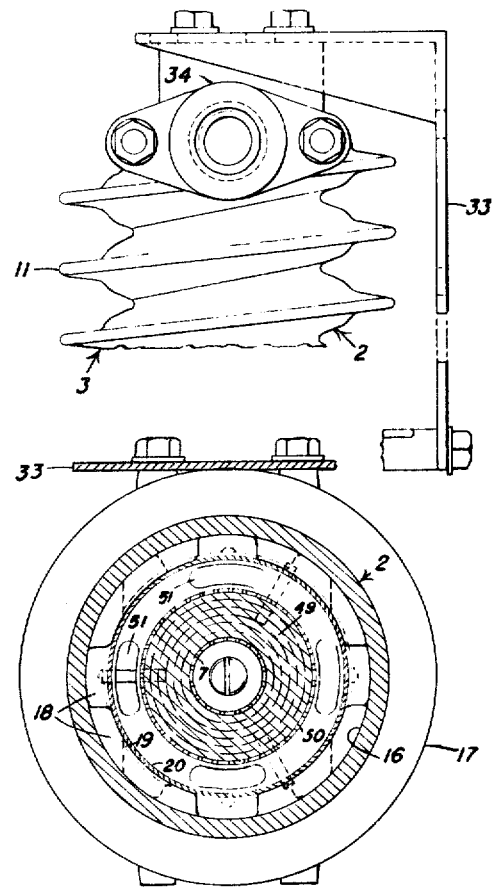
FIG. 5 is a fragmentary side elevational view of the embodiment of FIG. 4.
FIG. 7 is a horizontal sectional view on the scale of FIG. 2, taken along lines 7—7 of FIG. 3.

The improved assembly, designated as 1, is designed for the same types of uses as the assembly of FIG. 2 of Frantz U.S. Pat. No. 3,402,529 and is similar to the latter assembly in having a housing 2 divided vertically into upper and lower parts 3 and 4, respectively, bolted or otherwise detachably connected to each other, a sump 5 in the lower part for collecting contaminants separated from the air higher in the housing and a centrifugal separator in the upper part 3 in the form of a helical or spiral air passage 6 of triangular cross-section bounded inwardly by a suitably cylindrical vertical tube 7 slidably received in an axial bore 8 and outwardly by a helically convoluted upper portion 9 of the upper part's side wall 10. The similarity to the assembly of FIG. 2 of the patent also extends to the provision of a helical fin 11 outstanding from the side wall 10 of the upper portion 9 and following the helical convolution of the air passage 6.

Figure 3:
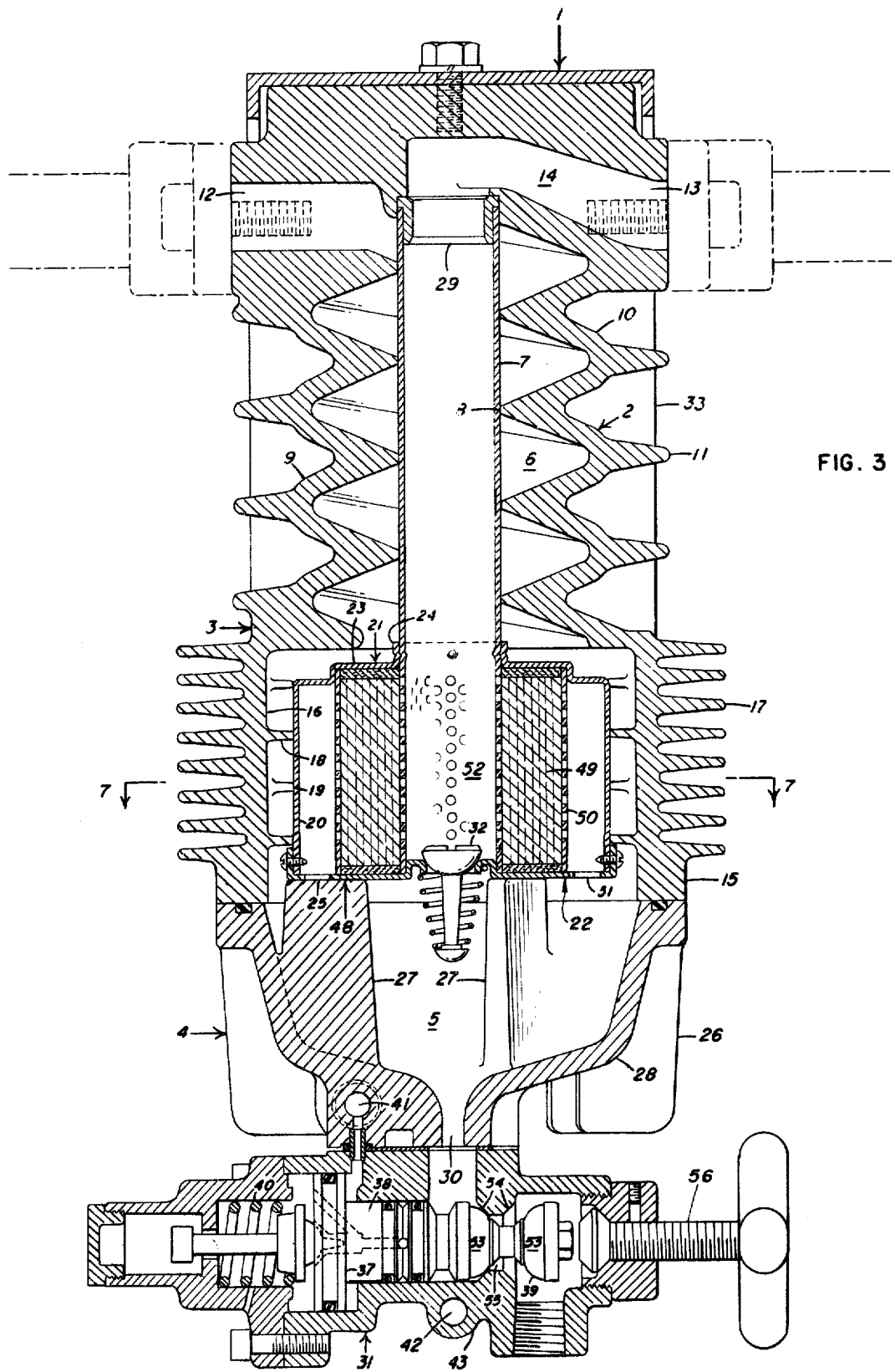
FIG. 3 is a central vertical sectional view of a second embodiment of the improved assembly.

Identical in the above respects, the embodiments of FIGS. 1 and 3 of the improved assembly are identical as a whole in their housings 2. In each embodiment dirty air is received through an inlet port 12 opening inwardly onto the upper end of the helical passage 6 and clean air is discharged through an outlet port 13 opening inwardly onto an outlet passage 14 in and adjacent the upper end of the upper part 3 and connected to and in open communication with the upper end of the central tube 7. The upper part 3 of the housing 2 is divided vertically into the upper portion 9 and a relatively wider or larger diameter lower portion 15 and the lower portion has a vertical side wall 16 externally finned by a plurality of vertically spaced radially outstanding annular fins 17. The side wall 16 also is internally finned by a plurality of vertically spaced rows of circumferentially spaced, radially directed internal fins or baffles 18. Suitably integral or rigid with and instanding from the side wall 16, the internal fins 18 of each row are staggered relative to those of any adjacent row and the internal fins together bound or define by their inner ends a central or axial vertical bore 19 concentric or coaxial with but of larger diameter or width than the axial bore 8 in the upper portion 9.

In the bore 19 is slidably received or seated a suitably cylindrical skirt 20 of a downwardly opening, generally bell-shaped, hood or casing 21 of a porous filter unit 22. Concentric or coaxial with the central tube 7, the hood 21 has a top wall 23 centrally apertured to receive the lower end of the tube and the hood and tube are rigidly connected or fixed to each other, as by fitting the tube into an annular flange 24 upstanding from the top wall and crimping or denting the flange and tube at intervals about their juncture. While openable, the bottom of the hood 21 is normally closed by a perforated bottom cap or cover plate 25 peripherally upwardly skirted to fit over and be screwed or otherwise releasably attached or secured to the lower end portion of the skirt 20.

The lower part or bowl 4 of the housing 2 is both externally and internally finned or ribbed, but, as opposed to the lower portion 15 of the upper part 3, by circumferentially spaced, vertical exterior and interior fins or ribs 26 and 27, respectively, the former outstanding and the latter instanding radially from and integral or rigid with the lower part's side 28. Extending upwardly into the lower portion 15 of the upper part 3, the internal fins 27 are flat-topped to seat against or engage the bottom cap 25 of the hood 21 of the filter unit for both supporting the latter and, by holding or pressing a gasket 29 in the upper end of the tube 7 against the housing about the upper end of the bore 8, sealing the hollow interior of the tube and the outlet passage 14 from the inlet port 12 and helical passage 6. A central drain port 30 in the lower part 4 at the low point of the sump 5 opens downwardly into a drain valve 31 releasably attached as by bolting and suspended from the bottom of the housing.

While alike in the foregoing structure, and also in having the bottom cap 25 of the filter unit 22 centrally apertured for seating a bypass check valve 32 opening upwardly under a predetermined pressure differential between the sump 5 and the tube 7 on obstruction or plugging of the filter unit 22, for passing air directly from the sump to the tube and in having a mounting bracket 33 for mounting the housing 2 on a suitable support (not shown), the assemblies of the embodiments of FIGS. 1 and 3 differ in several respects.

In the assembly of FIG. 1 the inlet and outlet ports 12 and 13 are formed in and connected to associated passages in the housing 2 through sub-housings 34 attached, as by bolting, to the housing and each containing or housing the appropriate of inlet and outlet check valves 35 and 36, respectively. Both of the check valves 35 and 36 are open to pass air while the assembly is filtering and each performs a definite function while the assembly is draining, when, as in this embodiment, the drain valve 31 is a single-seated valve with a single valve element held open by governor pressure during the unloading or idling cycle of the compressor (not shown) to which the assembly is directly connected. During that unloading cycle the outlet check valve 36 simply closes to block counterflow of air and loss of pressure in the compressed air system beyond the assembly. Thus, the spring force holding the outlet check valve closed may be any force that will close the valve when the assembly is draining and yield to allow the valve to open when the assembly again begins filtering. However, to be effective, the inlet check valve 35 must remain open after the assembly begins its draining cycle for enabling contaminants in the sump 5, as well as any in the line between the assembly and the compressor, to be drained or dumped by the pressure of the air through the drain port 30 when the drain valve 31 is open.

With the single-seated drain valve 31 of this first embodiment and without the inlet check valve 35, the direct connection of the assembly to the compressor would completely unload or exhaust the air from the compressor during the draining cycle. As will be understood, compressors in the installations for which the present assembly is designed, conventionally are driven directly off the vehicle's engine by a belt or now more usually a gear drive, and thus are constantly driven while the engine is running. To prevent a compressor from pumping additional air into the system when the pressure in the latter has reached a predetermined maximum, a governor valve opens at that point to pass the air from the compressor through a bypass line while maintaining sufficient pressure in the compressor to hold the rings seated and prevent slapping of the pistons and escape of oil past the rings. The inlet check valve enables this condition of the compressor to be maintained during draining by closing when the pressure in the compressor, while reduced, is still sufficient to hold the rings seated. A pressure in the 4 to 5 p.s.i. range is suitable for the purpose and the inlet check valve is set to close in that range. Not only does the inlet check valve, so set, prevent damage to the compressor and minimize its noise during draining of the filter assembly, but it also has the salutary effect of blocking ingress of air into the assembly at a pressure too low for the assembly to exert any cooling action with resultant build up of heat in the assembly and the necessity of removing that heat when the assembly returns to its filtering cycle.

For opening the drain port 30 for periodic draining whenever the compressor is unloaded, the single-seated drain valve 31 of the first embodiment has actuating pressure from the governor or bypass line (not shown) of the compressor fed to the actuating head 37 of a differential piston 38 carrying a single valve element 39 in opposition to a return spring 40, suitably through an actuating air port 41 in the base or lower portion of the housing 2 below the sump 5 and to a side of the drain port 30. When the compressor again begins pumping, the pressure to the port 41 is automatically cut off at the governor line and any pressure remaining in the drain valve is bled back to that line through the actuating air port, thus enabling the return spring 40 to close the valve. If desired, the drain valve can readily be heated by an electric heating element (not shown) for preventing congealing of contaminants in the sump 5 in cold weather. To that end the illustrated drain valve is provided with an aperture 42 in its body 43 below the differential piston 38 for seating a suitable heating element.

The other difference of the first embodiment from the second lies in the porous filter medium of the filter unit 22. In the first embodiment, the filter unit 22 is a scrubber with a steel wool or like filter medium 44 contained in the hood 21 between the bottom cap 25 and an intermediate plate 45 between the cap and the hood's top wall 23. An open-ended stub tube 46 inside the scrubber medium 44 and overlying the bypass check valve 32, is flanged at the bottom for welding or otherwise fixing it to the bottom cap 25 and tabbed at the top for holding the surrounding intermediate plate 45 in place. This stub tube contains a bypass passage 47 for enabling air to bypass the scrubber medium and the assembly to continue operating in case the medium becomes clogged.

In the second embodiment the scrubber filter unit 22 of the first embodiment is replaced by a fine filter unit 48 having as its filter element a paper or like fine filter element 49. The filter element 49 is contained outwardly by a radially perforated, suitably cylindrical sleeve 50 and inwardly by a radially perforated downward extension of the central tube 7 and the bottom cap 25 has openings 51 through which air enters the hood 21 for flow across the filter element 49 into the perforated extension of the tube 7. In this embodiment the tube 7 extends to the bottom cap 25 and surrounds the check valve 32, so that the interior of the perforated extension can serve as a bypass passage 52 for enabling air to flow past the filter element 49 in case the latter becomes clogged. Even though the two embodiments are illustrated with different types of filter units 22 and 48, the units are selectively interchangeable, with the selection depending on whether a scrubber unit for removing relative coarse particles or a fine filter unit for removing both finer particles and moisture is better or otherwise preferred in the particular installation.

The main difference of the assembly of the second embodiment from that of the first is the type of drain valve 31 used for draining the drain port 30. In the second embodiment of FIG. 3, the drain valve is a double-seated valve having a pair of opposed, inner and outer valve elements 53 carried by the differential piston 38 and alternately seatable in the adjoining of a pair of seats 54 at opposite sides of a common aperture 55. With this arrangement, application of actuating air through the port 41 to the actuating head 37, in moving the piston against the return spring 40, first unseats the inner element and then seats the outer element with the result that the aperture 55 is open for only a short interval. This alternate unseating of one element and seating of the other, but with the sequence reversed, occurs again when the actuating air is shut off. It is only during these two intervals at the beginning and end of the unloading cycle of the compressor that the drain port 30 is open for draining collected contaminants and the intervals are too short to unload any substantial amount of air in the lines in advance of and beyond the assembly. With this type of drain valve, the second embodiment therefore needs no check valve at either inlet or outlet port 12 or 13. In addition to automatic operation at the beginning and end of the compressor's unloading cycle, the double-seated drain valve of this second embodiment is provided with a manual override in the form of a stem 56 threaded into the end of the valve body 43 in line with and beyond the front end of the differential piston 38 and screwable into engagement with the end of the piston for unseating the inner valve element 53 against the force of the return spring and enabling the assembly to be drained at will in case of failure of the automatic operation.

The improved assembly is bottom draining or dumping and limited to three stages of filtering because of the restriction on its size imposed by the space available in the intended installations in trucks, buses and rapid transit cars. However, except that it normally has three stages of filtering instead of four, the assembly in filtering operates much in the same manner as does the Multi-Stage Air Filter Assembly of my copending application Ser. No. 412,015, filed concurrently herewith on Nov. 1, 1973. When compressed air directly from the compressor enters the inlet port 12 it is directed into the upper end of the helical air passage 6 and moves downwardly through the passage in a cyclonic or toroidal flow. Exerting centrifugal force on both the air and the entrained contaminants, the cyclonic flow simultaneously separates heavier contaminants and cools the air by concentrating the heat on the convoluted upper side wall portion 9 outwardly bounding the passage 6 for dissipation to ambient air through the side wall and helical fin 11. The air and separated contaminants move downwardly through the helical passage into the interior of the lower portion 15 of the upper part 3, whereafter the contaminants move by gravity past the hood 21 through the spaces between the staggered internal fins 18 and are collected in the sump 5 in the lower part 4.

On reaching the interior of the lower portion 15 the air from the helical passage 6 has its cyclonic flow arrested or broken up by the internal fins 18 as it passes therethrough. This, by preventing the formation of an insulating static boundary layer, enables the air to lose additional heat to ambient air through the side wall 16 and annular exterior fins 17, thereby further cooling the air and separating by condensation liquid contaminants reaching the point of saturation which then fall by gravity into the sump 5. Further cooling of the air is produced by the external and internal fins 26 and 27 of the lower part 4, with consequent further condensation of liquid contaminants. On striking or reaching the side 28 of the lower part 4, the air is reversed in direction and forced to flow upwardly to the filter unit 22 or 48 and through the filter element 44 or 49 of that unit and the central tube 7 for discharge as clean air through the outlet passage 14 and outlet port 13. In case the filter element 44 or 49 becomes plugged or clogged with contaminants, the pressure of the air in the sump will build up beyond the normal operating range and, by forcing open the bypass check valve 32 set to open at that point, will pass by the filter element so that the assembly can continue to operate, but as a two-stage filter until the next periodic inspection. When an inspection is made, access to the interior of the housing 2 is readily obtained by detaching the lower part 4 from the upper part 3, whereupon the filter unit can be slid out for cleaning in case of the scrubber unit 22 and replacement as necessary of the filter element 49 in the case of the fine filter unit 48.

From the above detailed description it will be apparent that there has been provided an improved plural stage filter which is connectable directly to a compressor, and, by subjecting compressed air normally to three or at least to two stages of filtering of different types, discharges clean air substantially free from contaminants, while periodically draining any contaminants separated in the first two stages and being adapted to prevent complete unloading and consequent damage to the compressor during the draining cycle. It should be understood that the described and disclosed embodiments are merely exemplary of the invention and that all modifications are intended to be included that do not depart from the spirit of the invention and the scope of the appended claims.

Having described my invention, I claim:

1. A plural-stage assembly for filtering compressed air, comprising a housing divided vertically into detachably connected upper and lower parts, said housing having on an upper portion of said upper part an inlet port connected directly to a compressor and an outlet port, a vertical bore in said upper portion of said upper part and having a downward extension of larger diameter in a lower portion of said part, a helical air passage in said upper portion about said bore and opening upwardly onto said inlet port and downwardly onto an interior of said lower portion outwardly of said bore extension therein, said helical passage directing compressed air from said inlet port to flow cyclonically downwardly therethrough for centrifugally filtering contaminants from said air and cooling said air by concentrating heat therefrom on said upper portion and discharging said air and contaminants into said interior of said lower portion outwardly of said bore extension, baffle means in said lower portion between a side wall thereof and said bore extension for arresting the cyclonic flow of said air to prevent forming of a boundary layer of dead air along said side wall while passing said air and contaminants, external finning on said upper and lower portions of said upper part for transferring heat to ambient air, a sump in said lower part opening upwardly onto said interior of said lower portion and having a drain port in a bottom thereof, external and internal finning on said lower part, a porous filter unit having a hood slidably received in said baffle means in said lower portion and seated in said downward bore extension and a filter element contained in said hood for filtering air passing therethrough from said sump, tube means fixed to said hood and slidably received in and extending upwardly through said bore for passing to said outlet port air received from said filter unit, and drain valve means suspended from said housing below said drain port for periodically draining therethrough contaminants collected in said sump.

2. A plural-stage assembly according to claim 1, wherein the baffle means are vertically spaced rows of circumferentially spaced baffles staggered relative to baffles of any adjoining row and instanding radially from the side wall of the lower portion to and laterally bounding the downward bore extension, and the external finning on said upper and lower portions are respectively a helical fin following the perimeter of the helical passage and a plurality of vertically spaced rows of annular radial fins.

3. A plural-stage assembly according to claim 2, wherein the external and internal finning of the lower part are circumferentially spaced vertical fins respectively radially outstanding and instanding from a side of said part and said inner vertical fins support the porous filter unit.

4. A plural-stage assembly according to claim 1, wherein the filter unit is one of a pair of selectively interchangeably coarse and fine filter units each removable with the tube fixed thereto from the housing on detachment of the lower part from the upper part.

5. A plural-stage assembly according to claim 1, wherein the drain valve means is a double-seated drain valve having a pair of opposed alternately seatable valve elements on a differential piston and opening at short intervals during advance and return movements of said piston for draining contaminants through the drain port without substantially affecting air pressure in advance of and beyond the assembly.

6. A plural-stage assembly according to claim 1, wherein the drain valve means is a single-seated drain valve having a single valve element on a differential piston and opening in response to unloading of the compressor, and including inlet and outlet check valve means respectively communicating with the inlet and outlet ports, said check valve means being open during a filtering cycle of the assembly, and said inlet check valve means closing at a pressure predetermined to prevent complete unloading of the compressor.

7. A plural-stage assembly according to claim 4, wherein the drain valve means is a double-seated drain valve having a pair of opposed alternately seatable valve elements on a differential piston and opening at short intervals during advance and return movements of the piston for draining contaminants through the drain port without substantially affecting air pressure in advance of and beyond the assembly.

8. A plural-stage assembly according to claim 4, wherein the drain valve means is a single-seated drain valve having a single valve element on a differential piston and opening in response to unloading of the compressor, and including inlet and outlet check valve means respectively communicating with the inlet and outlet ports, said check valve means being open during a filtering cycle of the assembly, and said inlet check valve means closing at a pressure predetermined to prevent complete unloading of the compressor.

9. A plural-stage assembly according to claim 4, wherein each of the filter units includes a bypass passage inside the filter element thereof, and a check valve normally closing said passage and openable under a predetermined pressure differential between the sump and said passage for enabling the filter element to be bypassed in the case of plugging thereof.

10. An assembly for filtering compressed air, comprising a housing having an inlet port connectable to an outlet of a compressor for admitting compressed air therefrom into said housing and an outlet port, said housing containing means for filtering compressed air passing therethrough between said inlet and outlet ports and a sump having a drain port for collecting and discharging contaminants, a drain valve opening independently of air pressure within said housing in response to and substantially throughout unloading of said compressor for draining contaminants from said sump through said drain port, and valve means in said inlet port for controlling flow of compressed air therethrough into said housing, said valve means being open during a pumping cycle of said compressor and closing at a predetermined low pressure during an unloading cycle thereof for then maintaining said low pressure in said compressor by preventing complete unloading thereof through said drain port.

11. An air filter assembly according to claim 10, including a check valve in the outlet port open while the compressor is pumping and closing on unloading thereof for preventing loss of pressure beyond the outlet port.

* * * * *